April 27, 1926. 1,582,118
C. S. BRAGG ET AL
POWER ACTUATOR FOR THE BRAKE MECHANISM OF AUTOMOTIVE VEHICLES
Filed April 3, 1925 3 Sheets-Sheet 2
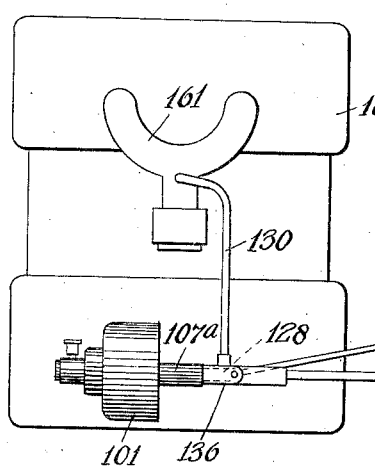
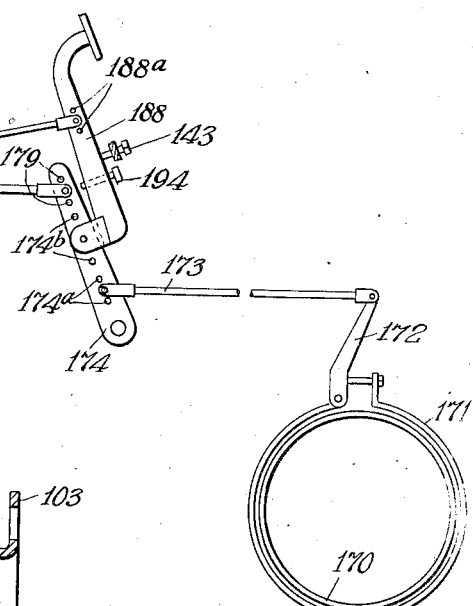

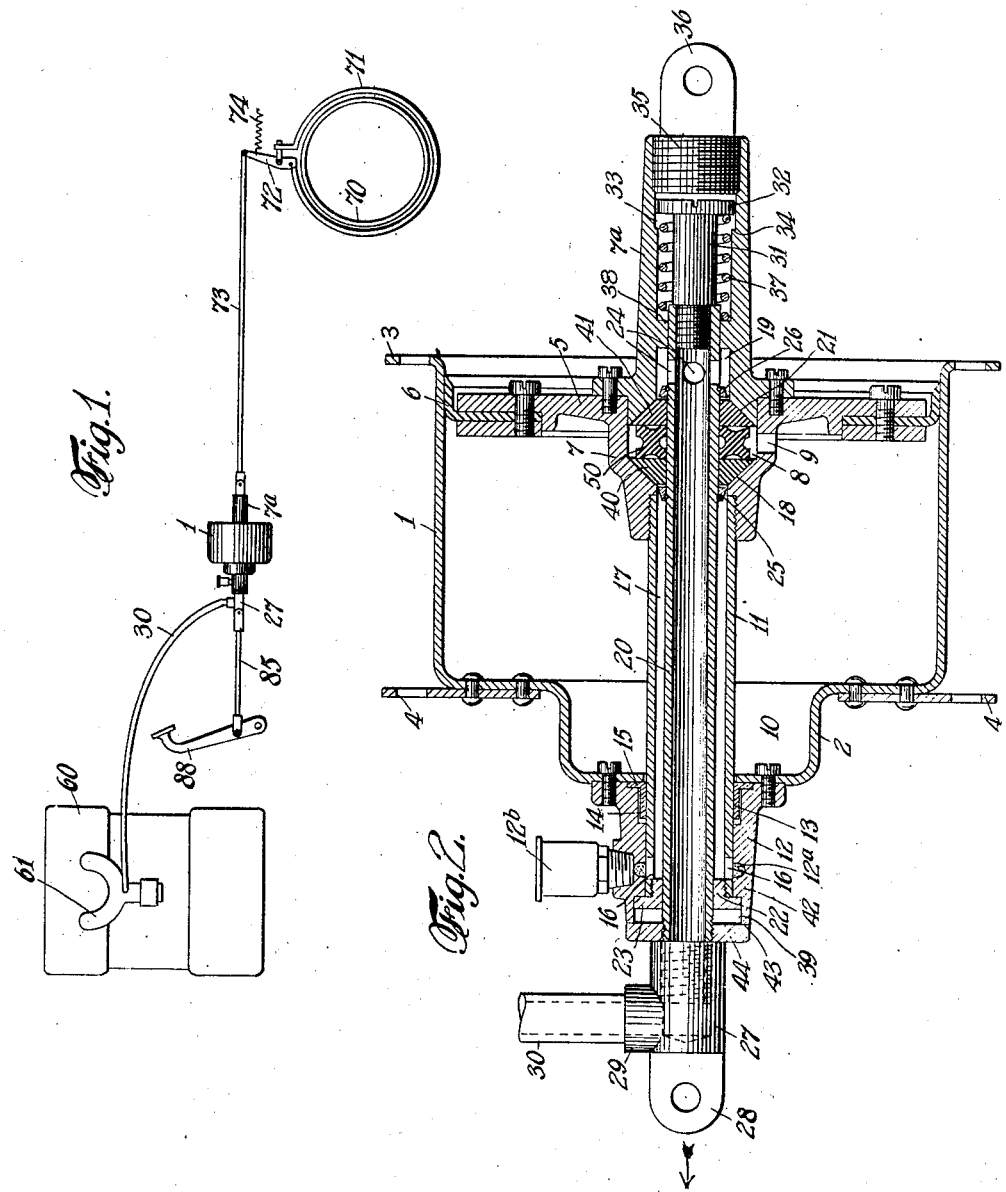

April 27, 1926.

C. S. BRAGG ET AL 1,582,118

POWER ACTUATOR FOR THE BRAKE MECHANISM OF AUTOMOTIVE VEHICLES

Filed April 3, 1925   3 Sheets-Sheet 3

INVENTORS
Caleb S. Bragg
Victor W. Kliesrath
BY
Louis ??? Whitaker
ATTORNEY

Patented Apr. 27, 1926.

1,582,118

UNITED STATES PATENT OFFICE.

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK.

POWER ACTUATOR FOR THE BRAKE MECHANISM OF AUTOMOTIVE VEHICLES.

Application filed April 3, 1925. Serial No. 20,332.

*To all whom it may concern:*

Be it known that we, CALEB S. BRAGG, a citizen of the United States, residing at Palm Beach, in the county of Palm Beach and State of Florida, and VICTOR W. KLIESRATH, a citizen of the United States, residing at Port Washington, in the county of Nassau and State of New York, have invented certain new and useful Improvements in Power Actuators for the Brake Mechanism of Automotive Vehicles; and we do hereby declare the following to be a full, clear, and exact description of the invention, such as will enable others skilled in the art to which it appertains to make and use the same.

Our invention consists in the novel features hereinafter described, reference being had to the accompanying drawings, which illustrate two embodiments of our invention, selected by us for purposes of illustration and the said invention is fully disclosed in the following description and claims.

The object of our invention is to provide a very simple form of power actuator for the brake mechanisms of automotive vehicles, having a single acting piston and controlling valves operated by an operator operated part, preferably the ordinary foot lever, or pedal lever, which is operatively connected with the actuator by means providing lost motion, sufficient to effect the operation of the valve mechanism by said pedal lever, which permits the operator to add his physical force to the force exerted by the actuator when desired, and also to positively operate the brake mechanism in case of failure of power.

In the accompanying drawings,

Fig. 1 represents more or less diagrammatically, a form of installation in connection with automotive vehicle in which actuator is operated by suction.

Fig. 2 is an enlarged sectional view of our improved actuator detached.

Fig. 3 is a view similar to Fig. 2, showing a slightly modified arrangement.

Fig. 4 is an enlarged sectional view of the actuator illustrated in Fig. 3.

Figure 5:
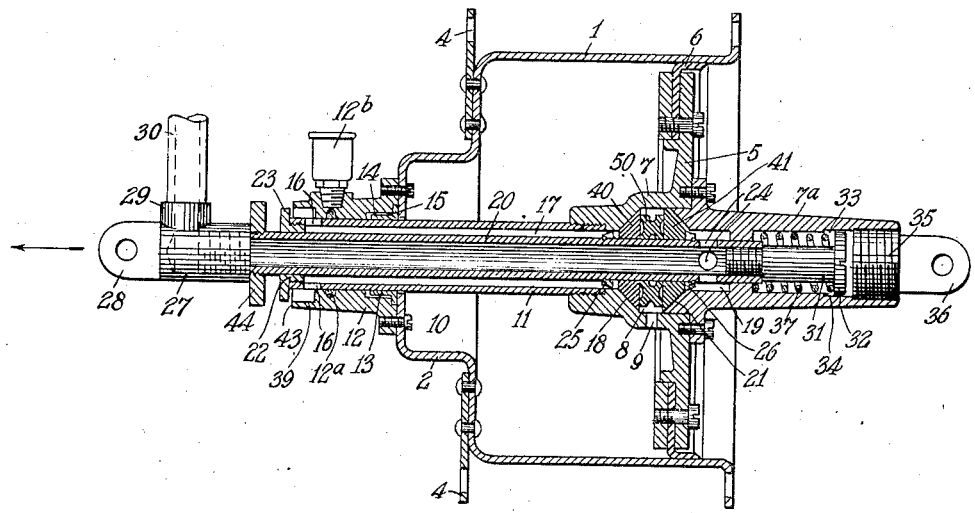
Fig. 5 is a sectional view similar to Fig. 2, showing the relative positions of the parts when the valve mechanism is actuated so as to effect a forward movement of the piston.

Referring to the form of actuator illustrated in Figs. 1 and 2, 1 represents a cylinder of our improved actuator, which is open at one end, and closed by a head, 2, at the other end. For convenience of installation, the open end of the cylinder may be provided with a projecting flange, indicated at 3, provided with bolt holes for attaching it to the chassis, and the head, 2, is also preferably provided with lateral projecting portions, indicated at 4, which may be in the form of an annular flange, if preferred, formed integrally with the head, or riveted, or otherwise secured thereto, and provided with bolt holes, for attaching it to the chassis. The cylinder may be conveniently formed as a stamping with the cylinder and head in one piece, as shown in the drawing, or it may be formed of cast metal, and the head may be formed separately and attached in any usual or preferred manner. 5, represents a movable piston located in the cylinder and provided with a gasket, 6. The piston is preferably provided with a hub, 7, which is conveniently formed in two parts, one part being integral with the piston itself, and the other part, indicated at 7ª, being formed separately and secured thereto. Within the hub is a valve chamber, indicated at 8, which communicates by one or more passages, 9, with the enclosed chamber, 10, formed within the cylinder between the piston and the closed end thereof, and the valves for controlling the actuator are located within this valve chamber. The piston is provided with a hollow piston rod, indicated at 11, extending through the head, 2, of the cylinder and through a sleeve, 12, formed integrally with the cylinder, or attached thereto, and containing a packing recess or stuffing box, indicated at 14, in which in located suitable packing for the piston rod, consisting in this instance of a rubber sleeve, 13, of slightly less diameter than the interior of the recess, 14, and having a projecting flange, 15, by which it is secured in position in the stuffing box. The piston rod, 11, is provided outside of the cylinder with air inlet apertures, indicated at 16, and the piston rod is provided interiorly with an air passage, indicated at 17, between it and the valve actuating sleeve, hereinafter described, which air passage communicates with the valve chamber, 8, by an aperture provided with a conical valve seat, 18, on one side of the valve chamber, and on the other side of the valve chamber, the piston hub is provided with a suction chamber, indicated at 19, communicating with the valve chamber by an aperture provided with a conical valve seat, 21. The outer end of the hollow piston rod, 11, is closed in this instance by a screw plug, 22, provided with a central aperture and having a laterally extending stop flange, 23. A valve actuating sleeve, indicated at 20, extends through the plug, 22, in the hollow piston rod, and the valve chamber, 8, of the piston hub, and is provided with apertures, 24, communicating with the suction chamber, 19, before referred to. The valve sleeve is provided within the valve chamber, 8, with two oppositely disposed valves, indicated at 40 and 41, having conical portions to engage the opposite valve seats, and being of annular form to fit upon the sleeve, 20, which is movable through the valve. These valves are preferably formed of rubber, but they may be made of other material, if preferred. The said valves, 40 and 41, are also yieldingly held seated when the parts are in normal or off position, and for this purpose we preferably employ an annular cushioning member, indicated at 50, composed of soft rubber and provided with interior, exterior and laterally grooved portions, to increase its resiliency, said cushioning member holding both valves seated and also sealing the central apertures in the valves through which the sleeve, 20, passes. The sleeve, 20, is also provided with means for opening one of the valves when the sleeve is moved in either direction, and for this purpose we have shown the sleeve provided with a collar, 25, secured to the sleeve adjacent to the outer surface of the valve, 40, and a collar, 26, secured to the sleeve adjacent to the exterior surface of the valve, 41, said collars being held in position by spring rings, or otherwise. The portion of the sleeve, 20, outside of the piston rod, 11, is provided with means for attaching it to an operator operated part, and also with means for connecting it with a source of suction. In this instance we have shown it provided with a fitting, indicated at 27, provided with an ear, or ears, 28, and having a lateral nipple, or socket, 29, communicating with the interior of the sleeve, 20, to which a suction pipe, 30, having a flexible portion, is connected, the suction pipe extending to the intake manifold, 61, of the internal combustion engine of the vehicle, indicated at 60 in Fig. 1. The sleeve, 20, is connected by a link, 85, with an operator operated part, preferably the ordinary service brake lever, or pedal lever, indicated at 88, pivotally mounted on the chassis. The valve actuating sleeve is also provided with means for connecting it with the piston, which provides sufficient lost motion to permit the operation of the valves. In this instance we have shown the valve sleeve, 20, provided within the piston hub member, 7ª, with a screw plug, indicated at 31, having a laterally projecting head, 32, or flange, engaging a recess, 33, in the hub member, which is provided at its inner end with a shoulder, 34, and at its outer end with a plug, 35, provided with attaching lugs, or ears, 36, to which the connecting linkage of the brake mechanism is connected. The sleeve, 20, may therefore be moved in either direction to the extent permitted by the length of the recess, 33. We also provide retracting means for the sleeve, 20, and the operator operated part, which is preferably located between the sleeve and the piston, so that the pressure exerted by the operator in moving the sleeve, 20, to effect the operation of the brake mechanism will be transmitted through the spring to the piston itself, and assist in moving the piston in a direction to apply the brakes instead of being wasted, as would be the case if the retracting spring were attached to the pedal lever and to the chassis in the ordinary manner. In this instance the retracting spring for the sleeve, 20, which is indicated at 37, is located in the piston hub member, 7ª, and surrounds the plug, 31, one end engaging the head or flange, 32, thereof, and the other end engaging an inwardly extending guiding flange, 38, inside of the hub member, 7ª.

We also prefer to provide means for arresting the piston in its normal or off position in which it is held, and to which it is returned by the load of the brake mechanism and the retracting springs thereof, and also for arresting the sleeve, 20, when the piston is in normal or off position, in such position that both of the valves, 40 and 41, are seated. In this instance the outer end of the sleeve, 12, on the head of the cylinder is provided with an annular recess, indicated at 39, provided at its inner end with a stop shoulder, 42, and the outer end of the sleeve, 12, is provided with an annular stop shoulder, indicated at 43. The shoulder, 42, serves as a stop for the piston and is engaged by the projecting flange, 23, on the piston rod, which is of such size that it will pass within the recess, 39. The sleeve, 20, is provided with a stop collar, indicated at 44, adjustably mounted thereon and held in adjusted position in any desired manner, which is of greater diameter than the stop flange, 23, on the piston hub, and engages a stop shoulder, 43, on the cylinder sleeve, 12, when the parts are in normal or off position, as indicated in Fig. 2, the parts being so adjusted that when in such position, both of the valves, 40 and 41, will be free from the valve operating devices, 25 and 26, on the sleeve, 20, and will be held seated by the sealing and cushioning member, 50. The sleeve, 12, is conveniently provided with an oiling recess, 12ª for the piston rod, and an oil cup, 12ᵇ, communicating therewith. In Fig. 1 we have illustrated diagrammatically the brake mechanism of the vehicle, 70 representing a brake drum, 71 a brake band, and 72 the brake applying lever for said band, which is connected by a link, 73, with the lug, or lugs, 36, of the piston hub. Usual retracting springs are employed for the brake applying lever, as indicated at 74, for example, if desired or necessary to insure the return of the piston to normal or off position.

Figure 6:
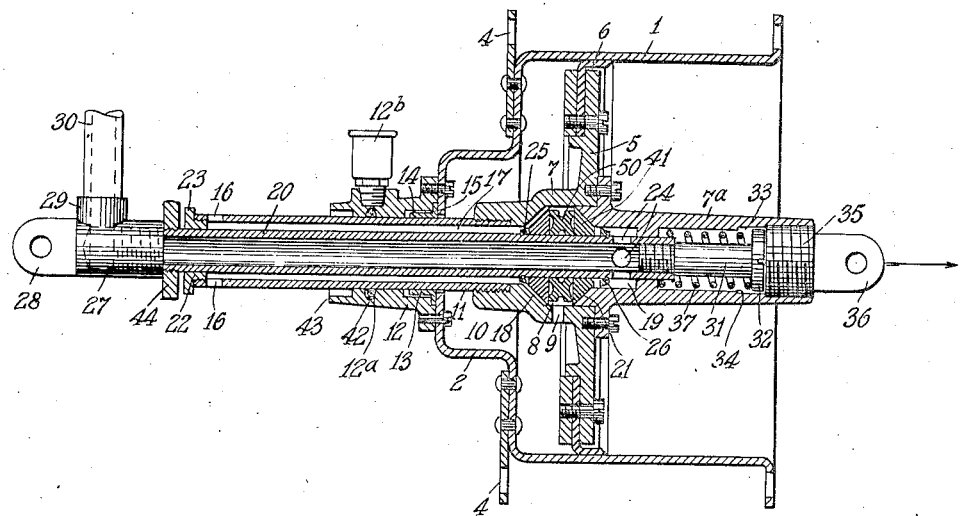
Fig. 6 is a similar view showing the position of the parts after the piston has been moved forward in the opposite direction to permit the piston to return to its normal position.

Assuming that the engine is running if it is desired to apply the brake mechanism, it is only necessary for the operator to apply his foot to the pedal lever, 88, and depress the same sufficiently to shift the valve sleeve, 20, in the direction of the arrow in Fig. 2, against the compresison of the retracting spring, 37, and effect the opening of the suction valve, 41 (as indicated in Fig. 5), thereby placing the chamber, 10, of the cylinder in communication with the suction chamber, 19, and suction pipe 30. The air will be exhausted from the cylinder chamber forward of the piston, and the pressure of the atmosphere on the rear face of the piston will cause the piston to move in the direction of the arrow, Fig. 2, thereby applying the brake. It will be noted that the compression of the spring, 37, will transmit the force exerted by the operator in so doing directly to the piston and assist in moving the piston forward. As soon as the operator stops depressing the pedal the forward movement of the sleeve, 20, will cease, and the piston will continue to move forward until the valve, 40, is closed sufficiently to merely sustain the load or resistance of the brake mechanism, and hold the brakes in the position to which they have been moved. A further movement of the pedal will cause the brakes to be applied to a greater extent, and if it is desired, the operator can, by applying sufficient power to the foot pedal, compress the springs, 37, until the heads, 32, of the plug, 31, engages the shoulder, 34, taking up the lost motion between the sleeve and the piston, when he can add his physical power to the power of the actuator in the application of the brake mechanism. When it is desired to release the brake mechanism, the operator allows the pedal, 88, to move rearwardly with respect to the piston, under the action of its retracting spring, 37, so as to open the valve, 40, and connect the cylinder chamber with the air passage, 17, communicating with the atmosphere as shown in Fig. 6, thereby admitting air to the cylinder and permitting the piston to be retracted to normal or off position by the load of the brake mechanism, and the retracting springs, thereof, the parts coming to rest in the position indicated in Fig. 2, as before described, when the valve, 40, will be permitted to seat.

In some instances it is desirable to install the actuator for the brake mechanism under the hood of the automotive vehicle, adjacent to the engine and forward of the foot pedal, and in Figs. 3 and 4 we have shown a slight modification of our invention, by which this can be readily accomplished. In these figures the parts which are identical with those previously described are given the same numbers with the addition of 100, and they need not be again described. As indicated in Fig. 4, the valve sleeve, 120, is in this instance projected from the rear end of the piston hub, instead of through the hollow piston rod, 111, and the piston rod is provided with a screw plug, 122, having a stop flange, 123, to engage a shoulder, 142, in this instance on the end of the cylinder sleeve, 112, to arrest the return movement of the piston, and said plug is provided with an air inlet aperture, 116, communicating with the air inlet passage, 117, in this instance through apertures, 116ª, in the sleeve, 120. For convenience of assembling the sleeve, 120, is provided with an extension, 131, screwed therein, and provided with apertures, 124ª, registering with similar apertures, 124, in the main sleeve, and communicating with the suction chamber, 119. This sleeve extension is provided with a lateral flange, 132, movable to a limited extent within a recess, 133, in the hub member, 107ª, provided with a stop shoulder, 134, at one end, and with a stop collar, 135 at the other end. Beyond this collar the sleeve is provided with a further extension, indicated at 120ª, extending through a stuffing box formed in the end of the hub member, 107ª, and provided with a packing sleeve, 114, in this instance held in position by a threaded stem, 113ª in which the stuffing box recess is formed, said stem being provided with bifurcated arms, 136, for the attachment of the connections extending to the brake mechanism. The exterior portion of the sleeve member, 120, is provided with a fitting, 127, provided with attaching ears, or lugs, 128, for connection with the foot lever, and with a nipple or socket, 129, to which the flexible suction pipe, 130, is connected, so as to communicate with the suction chamber, 119. It will be understood that the valve actuating sleeve is operatively connected with the foot lever and that the piston is operatively connected with the brake mechanism. Where this form of the actuator is employed, we prefer to employ the construction illustrated in Fig. 3. In this figure, 174, represents an actuating lever interposed between the piston of the actuator and the brake mechanism, and preferably arranged as shown, so as to multiply the power of the actuator, and thereby permit of the use of an actuator cylinder and piston of comparatively small diameter. The lever, 174, is pivoted to the chassis and is connected by a link, 185, adjacent to its upper end with the yoke members, 136, of the actuator piston. We prefer to provide a plurality of holes, indicated at 179, for enabling the link, 185 to be adjusted with respect to the pivotal axis of the arm, 174, the arm, 174, also being provided with a series of apertures, 174ª, located nearer the pivotal axis of the lever, and through one of these apertures a link, 173, is connected, which extends to the brake actuating lever, 172, thus applying the power of the actuator with increased leverage to the brake mechanism. Shoulder 142 acts as a stop for limiting the retracting movement of the lever, 174, under the action of the retracting springs of the brake mechanism. In this instance we have shown the pedal lever, 188, pivoted to the brake operating lever, 174, in such a manner as to permit the necessary lost motion between the two and also to considerably increase the leverage of the pedal not only to operate the valves with less movement of the foot, but to facilitate the operation of the brake mechanism by the foot of the operator in the event of a failure of the source of power. In this instance, 188, represents the pedal lever, pivoted to the lever, 174, intermediate the points of connection of the link, 185, and the link, 173, therewith, and we prefer to provide the lever, 174, with a plurality of apertures, 174ᵇ, to enable the fulcrum of the foot lever, 188, to be adjusted with respect to the pivotal axis of the brake lever, 174. The pedal lever, 188, is connected by a link, 193, with the ear or lug, 128, of the valve actuating sleeve, and the lever may be provided, as shown, with a series of apertures, 188ª, for adjusting the pivotal connections of the links, 193, thereof. We also provide the lever, 188, with means for adjusting the amount of lost motion between it and the lever, 174, in order that the full pressure of the operator's foot will not be applied to link rod, 193, which might buckle when the brakes are being applied by the physical force of the operator. In this instance we have shown a set screw, 194, passing through the pedal lever and engaging the lever, 174, when the foot lever is depressed. We also provide means for limiting the rearward movement of the valve actuating sleeve and pedal lever under the action of the retracting spring, 137, so that when the parts are restored to normal or off position, the valves, 140 and 141, may be held in seated position. This may be accomplished in a number of ways. In this particular instance we have shown an adjustable stop, 143, which is supported on the chassis in position to engage the foot lever, 188, when it is in its retracted position.

The parts being in the position shown in Figs. 3 and 4, if the operator places his foot on the pedal and depresses the pedal lever, the valve actuating sleeve, 120, will be shifted forwardly in the direction of the arrow, Fig. 4, so as to open the suction valve, 141, and withdraw the air from the cylinder chamber, 110. The piston will immediately move forward in the direction of the arrow, Fig. 4, drawing the upper end of the lever, 174, forward and also drawing forward with increased power due to the increased leverage, the rod, 173, and applying the brakes. As soon as the forward movement of the foot lever ceases, the piston will move forward until the valve, 141, is sufficiently closed to hold the actuator balanced against the load of the brakes. Further forward movement of the foot lever will effect a further forward movement of the piston until the brakes are fully applied and the operator can, by pressing upon the foot lever so as to bring adjustable screw, 194, into engagement with the lever, 174, and apply his physical force, with still further increased leverage to the lever, 174, and the brake mechanism. By allowing the pedal lever to move rearwardly under the action of the retracting spring, 137, the valve sleeve will be shifted so as to close the suction valve, 141, completely and open the air inlet valve, 140, thereby equalizing the pressures on opposite sides of the piston and permitting the load of the brakes and their retracting springs to restore the piston and connected parts to normal position, the pedal lever, 188, being arrested by the stop, 143, and the brake operating lever, 174, being arrested by the stop, 142.

The form of actuator herein shown and described is economical to build and can be very readily installed, and is particularly desirable in connection with the lighter automotive vehicles for the application of the brake mechanism thereof. The installation indicated in Figs. 3 and 4 is a very desirable one, as it permits the actuator cylinder and piston to be made of very small diameter, thereby reducing the amount of air drawn into the intake manifold in operating it, while the power is increased through the brake applying lever, 174, and the brakes may also be operated by the physical power of the operator when suction is not available, with increased leverage, as will be readily understood. For example, when the operator places his foot upon the pedal lever, assuming that there is a lack of suction, as when the engine is not running, or in case of failure of power for any reason, the first movement of the pedal will open the suction valve, as before stated, and thereby afford means for venting the cylinder, and as soon as the set screw, 194, comes in contact with the lever, 174, the brake mechanism may be directly applied by the physical power of the operator, and in a very effective manner.

What we claim and desire to secure by Letters Patent is:—

1. In a power actuator, the combination with a cylinder closed at one end and open at the other, a single acting piston in said cylinder, a hollow piston rod connected therewith and provided with means for connecting it with the part to be actuated, a valve chamber within the piston, communicating with the cylinder, connections from said valve chamber to a source of suction and to the atmosphere, oppositely disposed valves controlling said connections, yielding means for holding said valves seated, a valve actuating sleeve extending through said piston rod, piston, valve chamber and valves, and provided with means for opening one of said valves when said sleeve is moved in either direction, means for limiting the movement of the piston in a direction away from the closed end of the cylinder, and a stop for said sleeve, for holding it in position to permit both of said valves to seat.

2. In a power actuator, the combination with a cylinder closed at one end and open at the other, a single acting piston in said cylinder, a hollow piston rod connected therewith and provided with means for connecting it with the part to be actuated, a valve chamber within the piston, communicating with the cylinder, connections from said valve chamber to a source of suction and to the atmosphere, oppositely disposed valves controlling said connections, yielding means for holding said valves seated, a valve actuating sleeve extending through said piston rod, piston, valve chamber and valves, and provided with means for opening one of said valves when said sleeve is moved in either direction, a stop on said piston rod for engaging a part connected with the cylinder to limit the movement of the piston away from the closed end of the cylinder, and a stop on the said valve actuating sleeve for engaging a part connected with the cylinder to permit both of said valves to seat when the piston is in normal or off position.

3. In a power actuator, the combination with a cylinder closed at one end and open at the other, a single acting piston in said cylinder, a hollow piston rod connected therewith and provided with means for connecting it with the part to be actuated, a valve chamber within the piston, communicating with the cylinder, connections from said valve chamber to a source of suction and to the atmosphere, oppositely disposed valves controlling said connections, yielding means for holding said valves seated, a valve actuating sleeve extending through said piston rod, piston, valve chamber and valves, and provided with means for opening one of said valves when said sleeve is moved in either direction, means for limiting the movement of the piston in a direction away from the closed end of the cylinder, a stop for said sleeve, for holding it in position to permit both of said valves to seat, connections between said valve sleeve and said piston permitting sufficient relative movement of the said sleeve to effect the actuation of said valves, and an operator operated part connected with said sleeve, whereby the physical power of the operator can be applied to the piston when said lost motion is taken up.

4. In a power actuator, the combination with a cylinder closed at one end and open at the other, a single acting piston in said cylinder, a hollow piston rod connected therewith and provided with means for connecting it with the part to be actuated, a valve chamber within the piston, communicating with the cylinder, connections from said valve chamber to a source of suction and to the atmosphere, oppositely disposed valves controlling said connections, yielding means for holding said valves seated, a valve actuating sleeve extending through said piston rod, piston, valve chamber and valves, and provided with means for opening one of said valves when said sleeve is moved in either direction, means for limiting the movement of the piston in a direction away from the closed end of the cylinder, a stop for said sleeve, for holding it in position to permit both of said valves to seat, an operator operated part connected to said valve actuating sleeve, and a retracting spring for said sleeve interposed between said sleeve and the piston.

5. In a power actuator, the combination with a cylinder closed at one end and open at the other, a single acting piston in said cylinder, a hollow piston rod connected therewith and provided with means for connecting it with the part to be actuated, a valve chamber within the piston, communicating with the cylinder, connections from said valve chamber to a source of suction and to the atmosphere, oppositely disposed valves controlling said connections, yielding means for holding said valves seated, a valve actuating sleeve extending through said piston rod, piston, valve chamber and valves, and provided with means for opening one of said valves when said sleeve is moved in either direction, means for limiting the movement of the piston in a direction away from the closed end of the cylinder, a stop for said sleeve, for holding it in position to permit both of said valves to seat, an operator operated part connected to said sleeve, a part connected with said sleeve, and engaging a recess in a part connected with the piston, to connect the sleeve and piston and permit a limited amount of lost motion between them, and a retracting spring located between said part connected with the sleeve, and a part connected with the piston.

6. In a power actuator, the combination with a cylinder closed at one end and open at the other, a single acting piston in said cylinder, a hollow piston rod connected therewith and provided with means for connecting it with the part to be actuated, a valve chamber within the piston, communicating with the cylinder, connections from said valve chamber to a source of suction and to the atmosphere, oppositely disposed valves controlling said connections, yielding means for holding said valves seated, a valve actuating sleeve extending through said piston rod, piston, valve chamber and valves, and provided with means for opening one of said valves when said sleeve is moved in either direction, means for limiting the movement of the piston in a direction away from the closed end of the cylinder, a stop for said sleeve, for holding it in position to permit both of said valves to seat, an operator operated part connected to said sleeve, said sleeve being provided with a laterally projecting flange engaging a recess in a sleeve portion connected with the piston to connect said sleeve and piston and permit limited lost motion between them, and a retracting spring for said sleeve engaging said flange of said plug and a shoulder on the said sleeve portion connected with the piston.

7. In a power actuator, the combination with a cylinder closed at one end only, and a piston in said cylinder forming a chamber between it and the closed end of the cylinder, a valve chamber in the piston communicating with the said chamber, passages for connecting said chamber with the atmosphere and with a source of suction, a pair of oppositely disposed valves in said valve chamber for controlling said passages, yielding means for normally seating said valves, means for connecting a part to be actuated with said piston, an operator operated part, and a part connected therewith movable longitudinally in both directions with respect to said piston and extending into said valve chamber and operatively connected with said valves.

8. In a power actuator, the combination with a cylinder closed at one end only, and a piston in said cylinder forming a chamber between it and the closed end of the cylinder, a valve chamber in the piston communicating with the said chamber, a suction chamber on one side of said valve chamber and communicating therewith, a passage communicating with the atmosphere on the other side of said valve chamber and communicating therewith, oppositely disposed valves controlling said passages interposed between the valve chamber and said suction chamber and air passage, a hollow piston rod extending through the closed end of the cylinder and provided with an air inlet for said air passage, a valve actuating sleeve extending through said piston rod, operatively connected with said valves, and communicating with said suction chamber, said sleeve being provided with means for connecting it with a source of suction, an operator operated part connected with said sleeve, and means for connecting a part to be actuated with the piston.

9. In a power actuator, the combination with a cylinder closed at one end only, and a piston in said cylinder forming a chamber between it and the closed end of the cylinder, a valve chamber in the piston communicating with the said chamber, a suction chamber on one side of said valve chamber and communicating therewith, a passage communicating with the atmosphere on the other side of said valve chamber and communicating therewith, oppositely disposed valves controlling said passages interposed between the valve chamber and said suction chamber and air passage, a hollow piston rod extending through the closed end of the cylinder and provided with an air inlet for said air passage, a valve actuating sleeve extending through said piston rod, operatively connected with said valves, and communicating with said suction chamber, said sleeve being provided with means for connecting it with a source of suction, an operator operated part connected with said sleeve, and means for connecting a part to be actuated with the piston, the closed end of the cylinder being provided with a recess having an interior stop shoulder therein, and an exterior stop shoulder at its outer end, a stop on said piston rod for engaging said interior stop shoulder, and said sleeve being provided with a stop to engage said exterior stop shoulder, and a retracting spring for said sleeve.

In testimony whereof we affix our signatures.

CALEB S. BRAGG.
VICTOR W. KLIESRATH.